US011533752B2

(12) United States Patent
Sun et al.

(10) Patent No.: US 11,533,752 B2
(45) Date of Patent: Dec. 20, 2022

(54) UNLICENSED MEDIUM ACCESS WITHOUT LISTEN BEFORE TALK FOR MILLIMETER WAVE

(71) Applicant: QUALCOMM INCORPORATED, San Diego, CA (US)

(72) Inventors: Jing Sun, San Diego, CA (US); Vinay Chande, San Diego, CA (US); Arumugam Chendamarai Kannan, San Diego, CA (US); Srinivas Yerramalli, Hyderabad (IN); Xiaoxia Zhang, San Diego, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/248,733

(22) Filed: Feb. 4, 2021

(65) Prior Publication Data
US 2021/0251002 A1 Aug. 12, 2021

Related U.S. Application Data

(60) Provisional application No. 62/971,741, filed on Feb. 7, 2020.

(51) Int. Cl.
*H04W 74/08* (2009.01)
*H04W 52/24* (2009.01)
*H04W 16/28* (2009.01)
*H04W 16/14* (2009.01)

(52) U.S. Cl.
CPC ....... *H04W 74/0808* (2013.01); *H04W 16/14* (2013.01); *H04W 16/28* (2013.01); *H04W 52/245* (2013.01)

(58) Field of Classification Search
CPC . H04W 74/0808; H04W 16/14; H04W 16/28; H04W 52/245
See application file for complete search history.

(56) References Cited

U.S. PATENT DOCUMENTS

| 2013/0203458 | A1* | 8/2013 | Charbit | ................. | H04L 5/0032 |
| | | | | | 455/522 |
| 2016/0164644 | A1* | 6/2016 | Charbit | ............... | H04W 52/243 |
| | | | | | 370/329 |
| 2017/0339717 | A1* | 11/2017 | Futaki | .................... | H04W 72/14 |
| 2017/0359808 | A1 | 12/2017 | Dinan | | |
| 2018/0242359 | A1* | 8/2018 | Takano | ............. | H04W 72/0453 |
| 2018/0352577 | A1* | 12/2018 | Zhang | .................. | H04W 16/14 |

FOREIGN PATENT DOCUMENTS

EP 3432674 A1 1/2019

OTHER PUBLICATIONS

International Search Report and Written Opinion—PCT/US2021/016691—ISA/EPO—dated Sep. 6, 2021.

* cited by examiner

*Primary Examiner* — Ivan O Latorre
(74) *Attorney, Agent, or Firm* — Haynes and Boone, LLP

(57) ABSTRACT

Methods related to wireless communications systems and transmissions in an unlicensed radio frequency band of a shared spectrum are provided. A device determines whether one or more criteria are satisfied for accessing an unlicensed band of a shared spectrum without performing a listen-before-talk (LBT). The device transmits a communication signal in the unlicensed band without performing LBT in response to determining that the one or more criteria are satisfied.

30 Claims, 8 Drawing Sheets

UNLICENSED MEDIUM ACCESS WITHOUT LISTEN BEFORE TALK FOR MILLIMETER WAVE

CROSS REFERENCE TO RELATED APPLICATIONS

The present application claims priority to and the benefit of U.S. Provisional Patent Application No. 62/971,741, filed Feb. 7, 2020, which is hereby incorporated by reference in its entirety as if fully set forth below and for all applicable purposes.

TECHNICAL FIELD

This disclosure relates to wireless communication systems, and more particularly to medium access in unlicensed bands.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmW) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a reservation signal (e.g., a preamble) to reserve a channel occupancy time (COT) in the shared channel and may communicate with a receiving node during the COT. However, performing an LBT to reserve each and every COT can be an inefficient use of resources as a result of the overhead and delays associated with the LBT. Aspects of the present disclosure can provide a more efficient use of network resources with reduced latency by providing access to a shared spectrum without performing an LBT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication comprises determining, by a first wireless communication device, whether one or more criteria are satisfied for accessing an unlicensed band of a shared spectrum without performing a listen-before-talk (LBT), and transmitting, by the first wireless communication device to a second wireless communication device, a communication signal in the unlicensed band without performing the LBT in response to determining the one or more criteria are satisfied.

In an additional aspect of the disclosure, an apparatus comprises a processor configured to determine whether one or more criteria are satisfied for accessing an unlicensed band of a shared spectrum without performing a listen-before-talk (LBT), and a transceiver in communication with the processor, the transceiver configured to transmit, to a second wireless communication device, a communication signal in the unlicensed band without performing the LBT in response to the processor determining the one or more criteria are satisfied.

In an additional aspect of the disclosure, an apparatus comprises means for determining whether one or more criteria are satisfied for accessing an unlicensed band of a shared spectrum without performing a listen-before-talk (LBT), and means for transmitting, to a wireless communication device, a communication signal in the unlicensed band without performing the LBT in response to determining the one or more criteria are satisfied.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
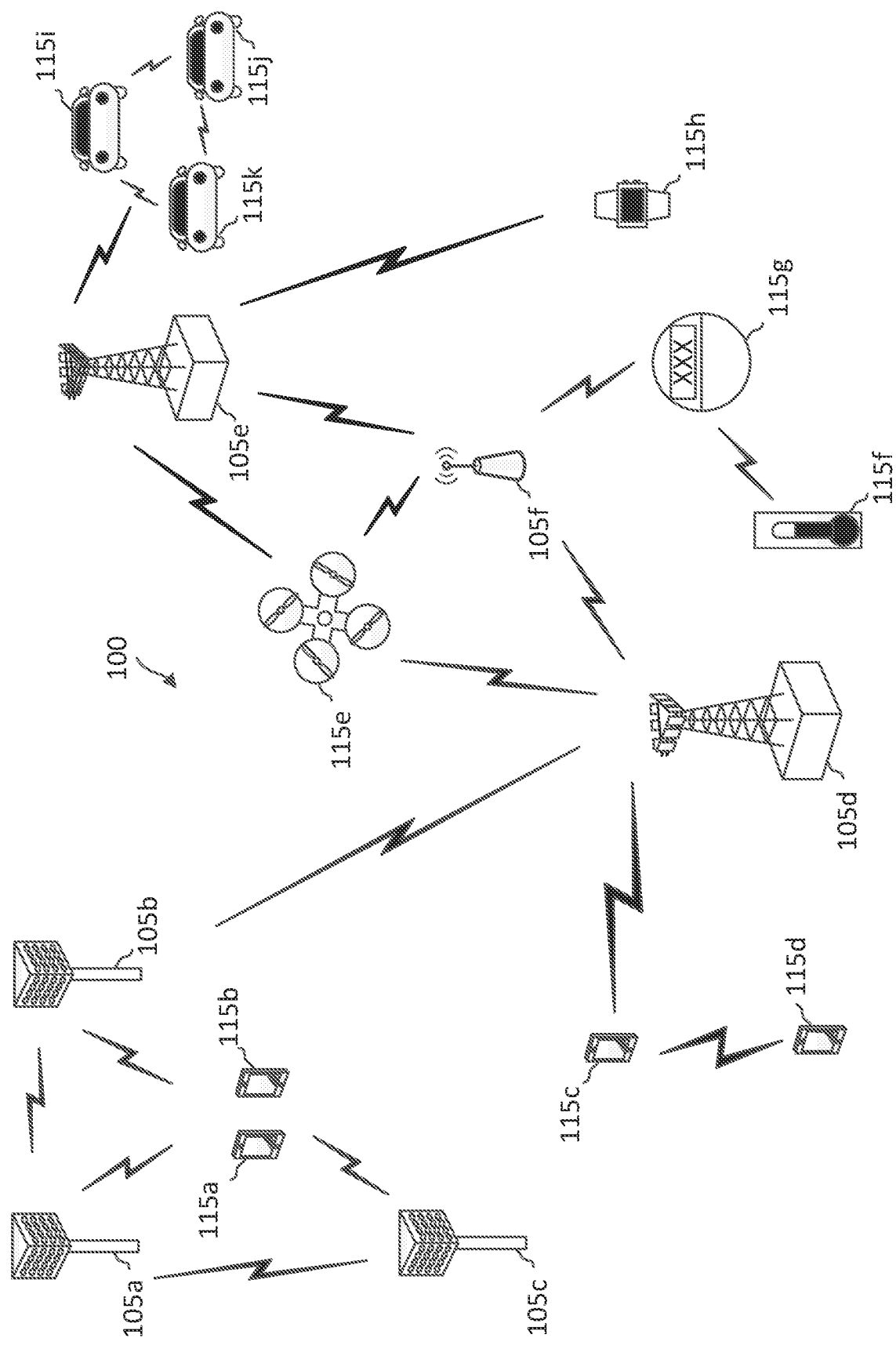
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

To enable coexistence among multiple devices in a shared or unlicensed spectrum, an LBT procedure may be used to assess whether a shared channel is clear before transmitting a signal in the channel During the initial phase of the LBT procedure, a device may perform a clear channel assessment (CCA) for a predetermined duration. During the CCA, the device may compare the energy level detected in the channel to a threshold value. If the energy level exceeds the threshold, the device may determine that the channel is occupied, refrain from transmitting a signal, and repeat the CCA after a period of time, or the device may reduce its transmit power to avoid interfering with other devices that may be using the channel. If the energy level is below the threshold, the device may determine that the channel is unoccupied and proceed with transmitting a signal. While LBT facilitates communications on a shared channel, the procedure may prove inefficient. For example, a device may unnecessarily refrain from transmitting if it incorrectly determines that the channel is occupied. And in contention resolution schemes where a device is to perform LBT before it can transmit on a shared channel, the device incurs the overhead of the CCA procedure even when the channel is clear for transmission.

In accordance with the present disclosure, devices designed to operate on mmW bands may access a shared spectrum without performing an LBT before every transmission. In some instances, a reduced likelihood of interference between devices can be utilized as a basis for accessing the shared spectrum without performing an LBT. The availability of larger beamforming gains over other spectrum bands through analog or hybrid beamforming on mmW bands can result in the use of transmitters and receivers with high directionality. As a result of the high directionality, transmitter nodes may have a spatially limited interference impact, and receiver nodes may have higher interference rejection capabilities. Millimeter wave band signals may undergo quick attenuation of signals (e.g., with a non-line-of-sight (NLOS) path loss exponent of around 4). Furthermore, devices designed for mmW bands can operate in short-range communication scenarios.

The present disclosure describes mechanisms for medium access in shared or unlicensed bands. For example, a device—which may be a UE or a BS—may transmit a signal in an unlicensed mmW band of a shared spectrum without performing LBT if it determines that one or more criteria are satisfied. Conversely, the device may perform LBT before transmitting the signal if it determines that the criteria are not satisfied. The device may also transmit a signal without LBT in directions for which the criteria are satisfied, but use LBT to transmit a signal in directions for which the criteria is not satisfied.

In some aspects, the criteria may include a power level satisfying a power threshold. The power level may include an equivalent Isotropic radiated power (EIRP) and/or a conducted power, either of which may be an instantaneous or average level.

In some aspects, the criteria may include a duty cycle satisfying a threshold. The duty cycle threshold may be correlated to the power threshold.

In some aspects, the criteria may include a number of spatial streams (also known as rank) satisfying a rank threshold. The rank threshold may be correlated to the power and/or duty cycle thresholds.

In some aspects, the criteria may include beam width, which may be an instantaneous beam width and/or an average beam width, satisfying a beam width threshold. The beam width may also include a set of beam widths.

In some aspects, the criteria may include any combination of the criteria above, and two or more of the of the parameters corresponding to any of the criteria above may be correlated.

Aspects of the present disclosure can provide several benefits. For example, by avoiding the overhead of LBT and/or CCA in situations where one or more criteria are met, devices operating in a shared or unlicensed band can communicate more efficiently with interference management among the devices. Similarly, devices may be less likely to delay or refrain from transmitting a signal in response to a false positive result from the LBT process indicating that the channel is occupied when it is actually clear. Accordingly, spectrum utilization efficiency can also be improved.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS105 for UL transmission by performing a CAT4 LBT. In some instances, the UE 115 may also share the UE 115's COT with the BS 105.

In some aspects, the BS 105 and/or UE 105 may communicate in an unlicensed spectrum without using LBT. The BS 105 and/or UE 105 may consider various criteria—for example, whether average and/or instantaneous power levels, duty cycles, beam widths, and number of spatial streams satisfy specific thresholds—to determine whether to transmit a signal without using LBT. If the criteria is not met, the BS 105 and/or UE 105 may instead determine to transmit the signal without using LBT. The determination may be made on a direction-by-direction basis, so that if the criteria is met only in some directions, the BS 105 and/or UE 105 may transmit a signal without using LBT only in those directions, but employ LBT when transmitting in other directions. The directions may refer to spatial directions or beam directions.

Figure 2:
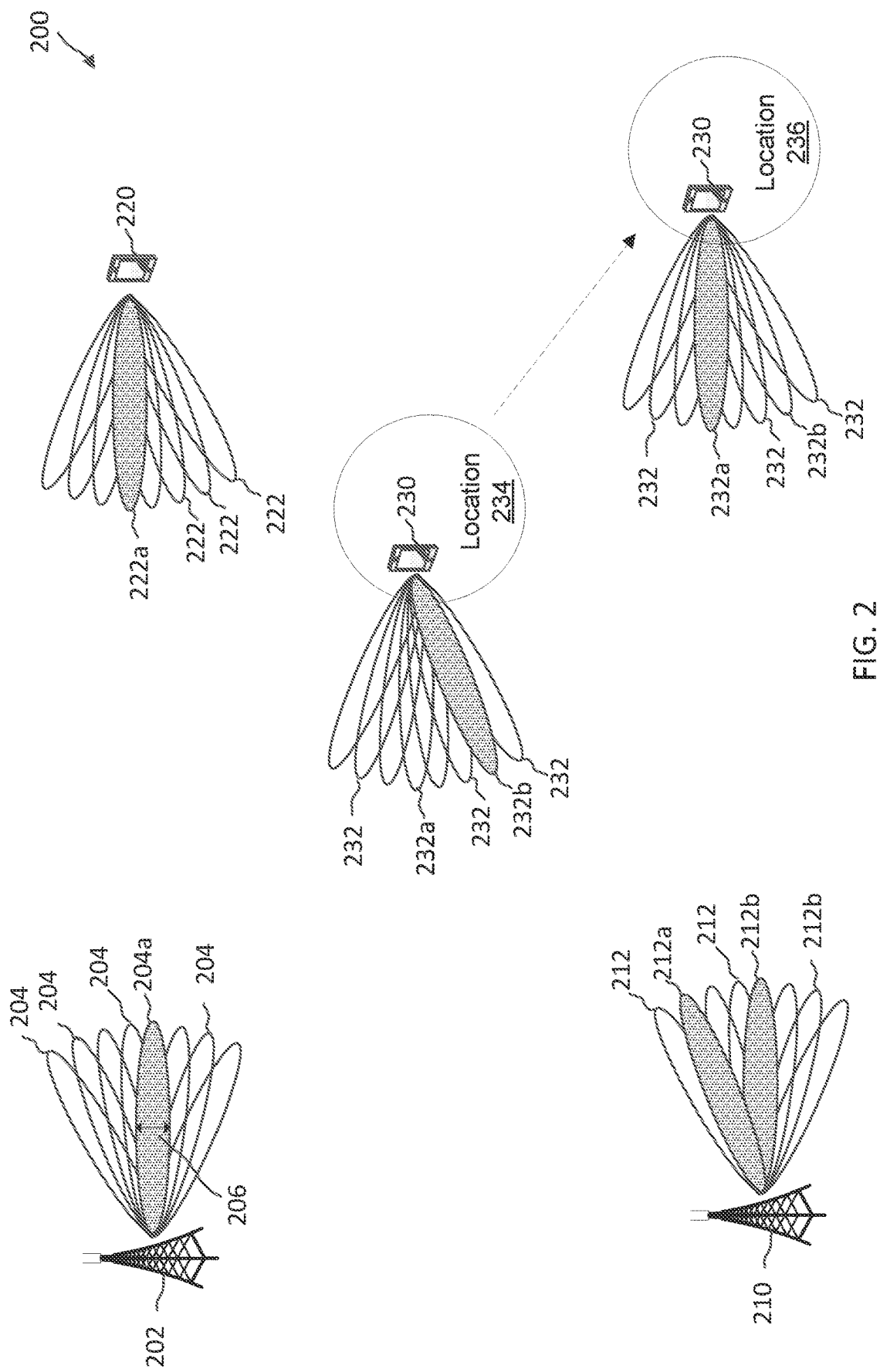
FIG. 2 illustrates a wireless communication network according to some aspects of the present disclosure.

FIG. 2 illustrates a wireless communication network 200 according to some aspects of the present disclosure. The network 200 may correspond to a portion of the network 100. The network 200 provides a more detailed view of communications between BSs and UEs. FIG. 2 illustrates two BSs (a BS 202 and a BS 210) and two UEs (a UE 220 and a UE 230) for purposes of simplicity of discussion, though it will be recognized that embodiments of the present disclosure may scale to any suitable number of UEs (e.g., about 3, 4, 5, 6, 7, or more) and/or any suitable number of BSs (e.g., about 3, 4, 5, 6, 7, or more). The BSs 202 and 210 may be similar to the BSs 105. The UEs 220 and 230 may similar to the UEs 115.

BS 202 is in communication with UE 220, while BS 210 is in communication with UE 230, initially at location 234. BS 202 may use a number of directional beams 204 to communicate with UE 220. Each beam 204, 212, 222, and 232 of every device, for example, beam 204*a* of BS 202, may have a corresponding beam width 206. BS 202 may choose a beam 204 based on the position of the UE 220 in relation to the BS 202 and/or any other environmental factors such as scatterers in the surrounding. In FIG. 2, the BS 204 has selected beam 204*a* to communicate with the UE 220 because the direction of beam 204*a* is oriented toward the position of UE 220. Similarly, UE 220 has selected beam 222*a* to communicate with BS 202 based on the direction of beam 222*a*. When UE 230 is at position 234, signals transmitted from BS 210 to UE 230 may interfere with communications between BS 202 and UE 220 as UE 220 is in the line of sight (LOS) of BS 210. For simplicity, only one beam is illustrated as active for each device in FIG. 2, but each device may use multiple beams to communicate with another device, or with any number of devices.

BS 210 may use a number of directional beams 212 to communicate with UE 230. The BS 202 may choose a beam 204 based on the position of the UE 220 in relation to the BS 202. When UE 230 is at position 234, BS 210 may select beam 212*a* to communicate with UE 230 because the direction of beam 212*a* is oriented toward the position of UE 230. Similarly, UE 230 may choose beam 232*b* while at location 234 to communicate with BS 210. Should UE 230 move to a different location 236, UE 230 may choose beam 232*a* and BS 210 may choose beam 212*b* to communicate based on the new location 236 of UE 230.

Figure 3:
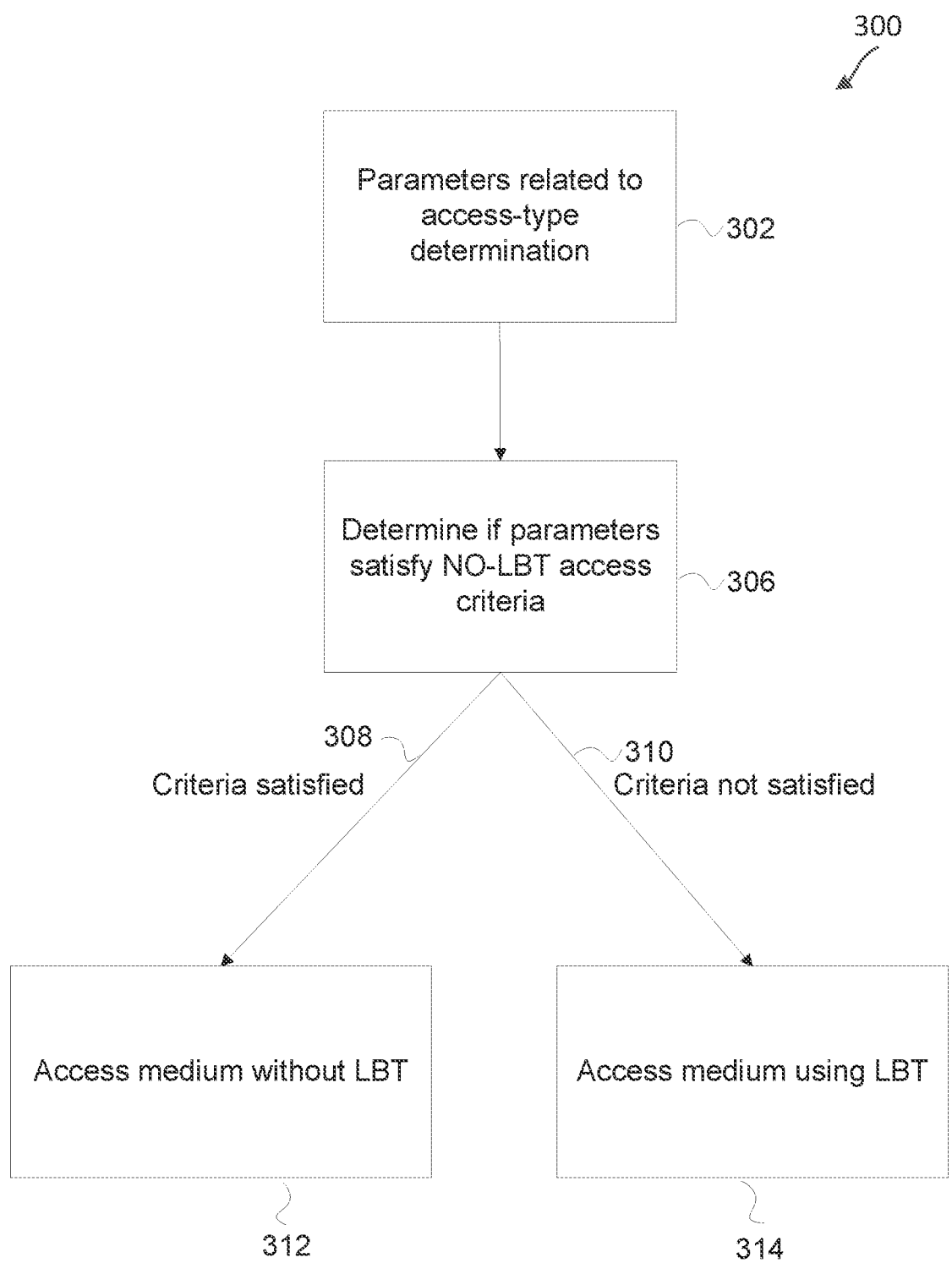
FIG. 3 illustrates a medium access method according to some aspects of the present disclosure.

FIG. 3 illustrates a medium access method 300 according to some aspects of the present disclosure. Aspects of the method 300 can be executed by a computing device (e.g., a processor, processing circuit, and/or other suitable component) of a wireless communication device or other suitable means for performing the steps. For example, a wireless communication device, such as the UE 115, 220, or 230, may utilize components as will be discussed further below in FIG. 4, to execute the steps of method 300. Alternatively, a wireless communication device, such as the BS 105, 202, or 210, may utilize components as will be discussed further below in FIG. 5, to execute the steps of method 300. The method 300 applies various criteria to limit the impact of interference from a node performing a no-LBT transmission to another node. At a high level, the method 300 may limit the amount of interference, the persistence of interference, and/or the spatial extent or spatial occupancy of interference for a no-LBT transmission.

At step 302, a device (which may be a BS 115, 202, or 210 or a UE 105, 220, or 230) may consider parameters related to various criteria for determining whether to access the medium without using LBT. The parameters may, for example, be related to the amount of interference, the persistence of interference, and/or the spatial extent or spatial occupancy of interference for an upcoming transmission and may be measured, determined, or calculated.

The amount of interference may include an estimated (or expected) EIRP or an estimated (or expected) conducted power to be used for the upcoming transmission. The EIRP and/or conducted power can be an instantaneous power value, a linear average power value, a log-domain average power value (e.g., in decibels (dB)). Conducted power may refer to the transmitter power at the radio front-end. EIRP may refer to the product of transmitter power and the antenna gain in a given direction relative to an isotropic antenna of a radio transmitter. The device may determine the EIRP or conducted power based on a pre-configuration. For instance, the device may have transmission power data associated with conducted power and/or EIRP and corresponding transmit configurations stored at a memory. The transmission power data may be pre-calibrated. The determining or calculating of the parameters may include reading an EIRP or a conducted power from the memory, for example, for a certain transmit configuration.

The persistence of interference—the amount of time during which a device may cause interference—may include an estimated (or expected) duty cycle, an estimated (or expected) average duty cycle, and/or an estimated (or expected) longest transmission burst duration of the upcoming transmission and/or previous transmissions. The device may determine a duty cycle based on the fraction or percentage of time over a certain time window when the device is active in transmission. The device may determine an average duty cycle by averaging duty cycles over non-overlapping time windows. Alternatively, the device may determine an average duty cycle by averaging duty cycles over a moving average window or a rolling window. The average may be calculated logarithmically or linearly. In some instances, the device may apply a linear filter to the averaging operations. In some instances, the linear filter may have a non-uniform response.

The spatial extent or spatial occupancy of interference—the area or region in a 3D space over which a device may cause interference—may include a beam direction, a beamwidth limit, and/or a rank (or number of spatial streams) to be used for the upcoming transmission.

At step 306, the device may determine whether the parameters of step 302 satisfy criteria (the NO-LBT access criteria) for accessing the medium without employing an LBT procedure. For example, the criteria may include a threshold being met for any or all of an average and/or instantaneous power level, duty cycle, beam width, and/or number of spatial streams. The device may make the determination on a per-beam-direction basis, so that in some directions, the device may determine that a threshold is met, and in other directions, the device may determine the threshold is not met. The device may also decide that the NO-LBT access criteria is satisfied if only a subset of the parameters of step 302 satisfy their respective criteria. That is, device may determine that the NO-LBT criteria is satisfied even if some of the parameters of 302 do not satisfy their respective criteria.

If the device determines that the NO-LBT access criteria is satisfied, the device will follow branch 308 to step 312 and access the medium without performing LBT. The device may follow branch 308 to step 312 for some or all beam directions. That is, if only some beam directions satisfy the NO-LBT access criteria, the device may determine to access the medium without LBT only for those beam directions.

Alternately, if the NO-LBT access is not satisfied, the device may follow branch 310 to step 314 and access the medium using LBT. The device may follow branch 310 to step 314 for some or all beam directions. That is, if only some beam directions fail to satisfy the NO-LBT access criteria, the device may determine to access the medium using LBT only for those beam directions.

Figure 4:
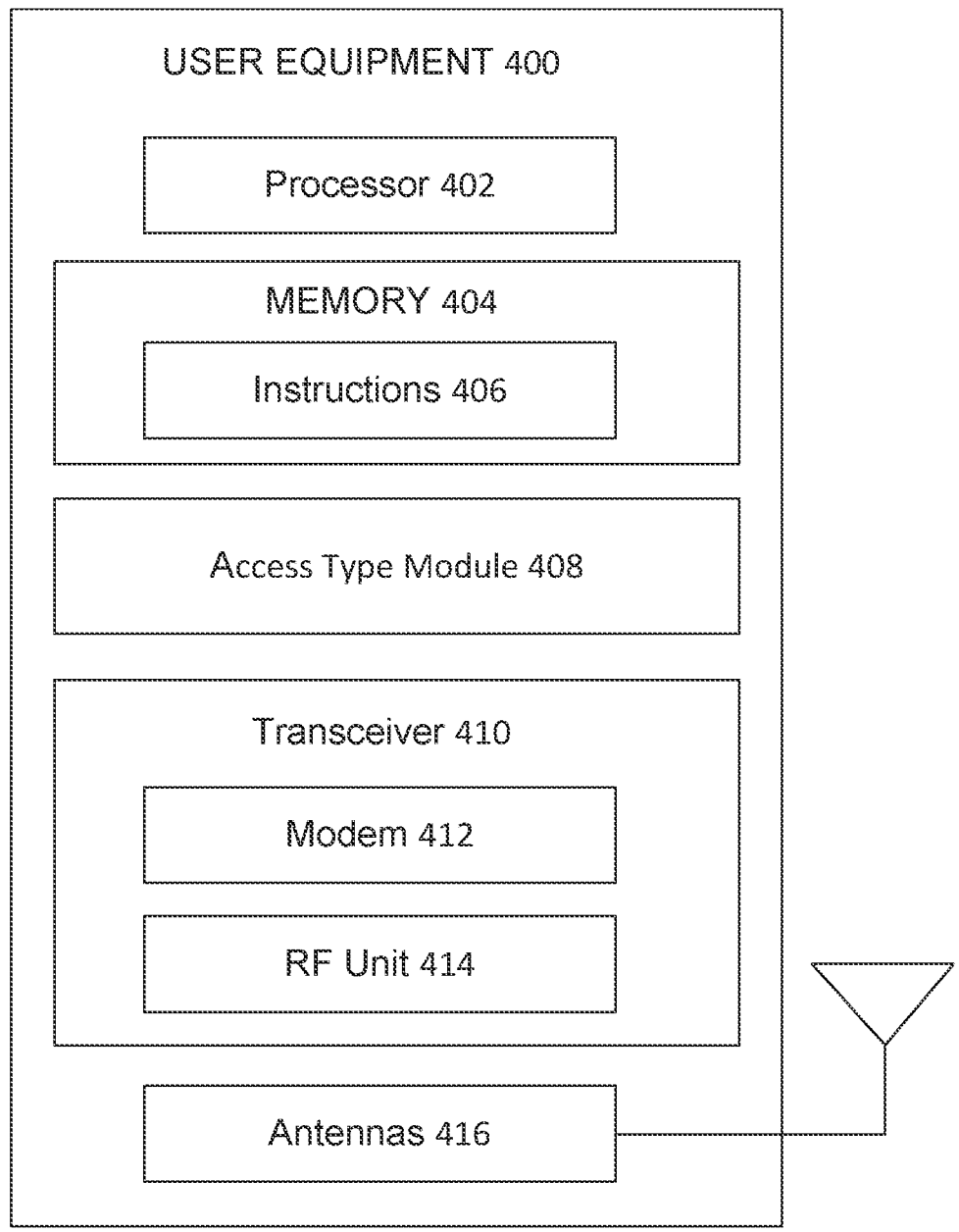
FIG. 4 is a block diagram of an exemplary user equipment (UE) according to some aspects of the present disclosure.

FIG. 4 is a block diagram of an exemplary UE 400 according to some aspects of the present disclosure. The UE 400 may be a UE 115 discussed above in FIG. 1. As shown, the UE 400 may include a processor 402, a memory 404, an access type module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 4-9. Instructions may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The access type module 408 may be implemented via hardware, software, or combinations thereof. For example the access type module 408 may be implemented as a processor, circuit, and/or instructions 406 stored in the memory 404 and executed by the processor 402. In some examples, the access type module 408 can be integrated within the modem subsystem 412. For example, the access type module 408 can be implemented by a combination of software components (e.g., executed by a DSP or a general processor) and hardware components (e.g., logic gates and circuitry) within the modem subsystem 412.

The access type module 408 may be used for various aspects of the present disclosure, for example, aspects of FIGS. 6A-6C and 7-8. The access type module 408 is configured to determine whether to access a network without using an LBT procedure. The access type module 408 may make the access type determination based on one or more sets of criteria. The access type module 408 may measure, determine, or calculate various parameters related to the present operating conditions of the UE 400 and the network, for example network 100 of FIG. 1. The parameters may include, for example, average and/or instantaneous power levels, duty cycles, beam widths, and number of spatial streams, and may be measured, determined, or calculated for each possible beam direction. The access type module 408 may consider various criteria involving the parameters. For example, the access type module 408 may determine whether each of the parameters meets a threshold or satisfies various conditions. The threshold values may include a power threshold, for example an EIRP or conducted power threshold, a duty cycle threshold, a beam width threshold, and a spatial stream or rank threshold. If the one or more sets of criteria are satisfied, the access type module 408 may determine that the UE 400 may access the network without using LBT. Otherwise, the access type module 408 may determine that the UE 400 should use an LBT procedure to access the network. The access type module 408 may also evaluate whether the one or more sets of criteria are satisfied on a direction-by-direction basis. That is, the access type module 408 may determine that the criteria are satisfied in some beam directions but not others, and determine that the UE 400 may transmit on the network, to, for example, a BS 105 or 500 of FIG. 5, without LBT in directions for which the criteria are satisfied, but transmit with LBT in directions for which the criteria are not satisfied.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the configured transmission module 507 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUSCH signal, PUCCH signal, UL data, UL control information) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., PDSCH signal, PDCCH, DL data, DL control information, RRC configuration, rules for applying no LBT mode) to the configured transmission module 507 for processing. The antennas 416 may include multiple antennas of similar or different designs in order to sustain multiple transmission links. The RF unit 414 may configure the antennas 416.

In an aspect, the processor 402 is configured to coordinate with the access type module 408 to determine whether one or more criteria are satisfied for accessing an unlicensed band of a shared spectrum without performing a listen-before-talk (LBT). The transceiver 410 is configured to coordinate with the access type module 408 to transmit, to a second wireless communication device, a communication signal in the unlicensed band without performing the LBT in response to the processor 402 determining the one or more criteria are satisfied.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
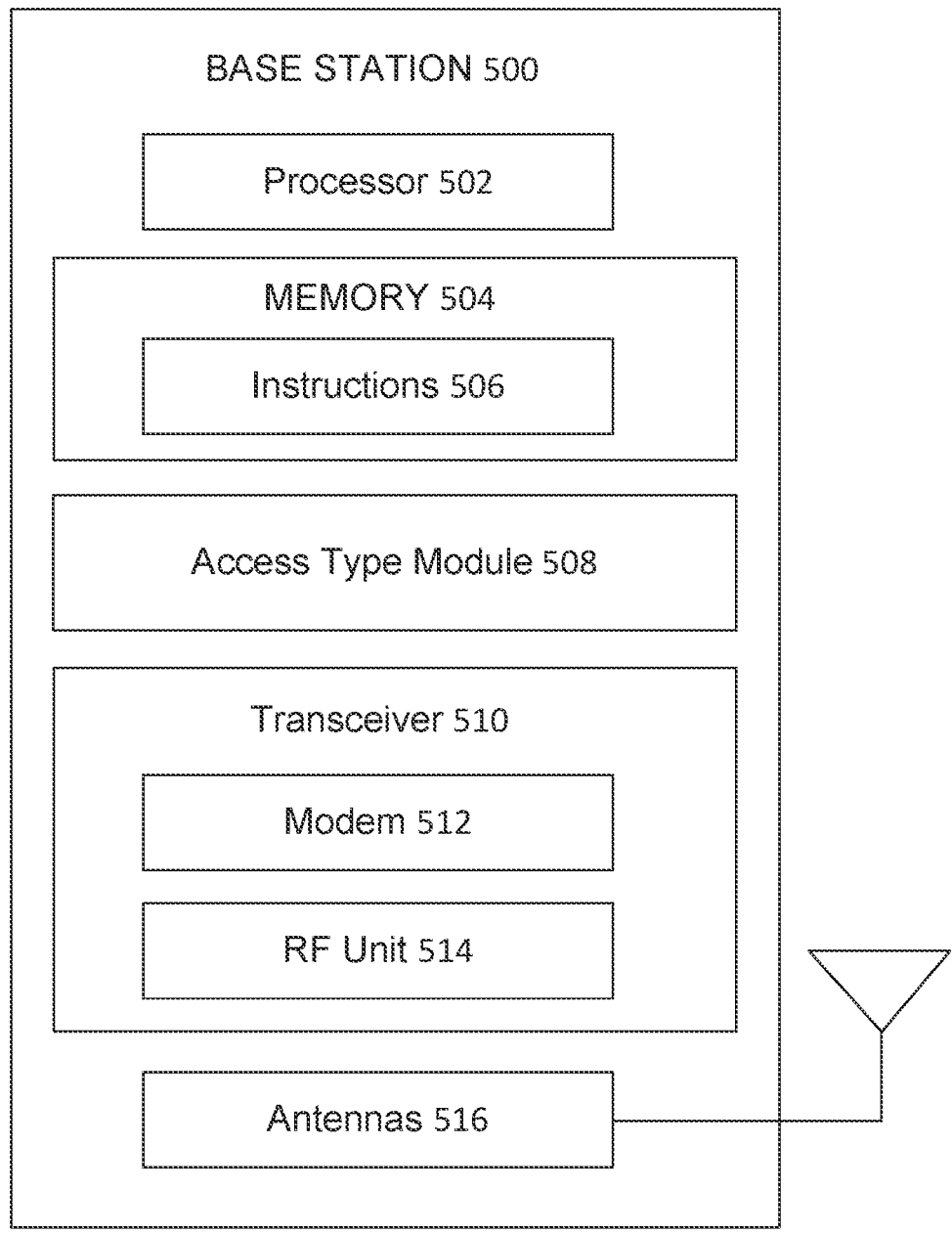
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. As shown, the BS 500 may include a processor 502, a memory 504, an access type module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 4-9. Instructions 506 may also be referred to as program code, which may be interpreted broadly to include any type of computer-readable statement(s) as discussed above with respect to FIG. 4.

The access type module 508 may be implemented via hardware, software, or combinations thereof. For example, the access type module 508 may be implemented as a processor, circuit, and/or instructions 506 stored in the memory 504 and executed by the processor 502. In some examples, the access type module 508 can be integrated within the modem subsystem 512. For example, the access type module 508 can be implemented by a combination of software components (e.g., executed by a DSP or a general processor) and hardware components (e.g., logic gates and circuitry) within the modem subsystem 512.

The access type module 508 may be used for various aspects of the present disclosure, for example, aspects of FIGS. 6A-6C and 7-8. The access type module 508 is configured to determine whether to access a network without using an LBT procedure. The access type module 508 may make the access type determination based on one or more sets of criteria. The access type module 508 may determine or calculate various parameters related to the present operating conditions of the BS 500 and the network, for example network 100 of FIG. 1. The parameters may include, for example, average and/or instantaneous power levels, duty cycles, beam widths, and number of spatial streams, and may be measured, determined, or calculated for each possible beam direction. The access type module 508 may consider various criteria involving the parameters. For example, the access type module 508 may determine whether each of the parameters meets a threshold or satisfies various conditions. The threshold values may include a power threshold, for example an EIRP or conducted power threshold, a duty cycle threshold, a beam width threshold, and a spatial stream or rank threshold. If the one or more sets of criteria are satisfied, the access type module 508 may determine that the UE 500 may access the network without using LBT. Otherwise, the access type module 508 may determine that the BS 500 may use an LBT procedure to access the network. The access type module 508 may also evaluate whether the one or more sets of criteria are satisfied on a direction-by-direction basis. That is, the access type module 508 may determine that the criteria are satisfied in some beam directions but not others, and determine that the BS 500 may transmit on the network, to, for example, a UE 115 or 400, without LBT in directions for which the criteria are satisfied, but transmit with LBT in directions for which the criteria are not satisfied.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PDSCH signal, PDCCH signal, DL data, scheduling grants, RRC configurations, rules for applying no LBT mode) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUSCH signal, PUCCH signal, UL data, UL control information) to the access type module 508 and configured transmission module 508 for processing. The antennas 516 may include multiple antennas of similar or different designs in order to sustain multiple transmission links.

In an aspect, the processor 502 is configured to coordinate with the access type module 508 to determine whether one or more criteria are satisfied for accessing an unlicensed band of a shared spectrum without performing a listen-before-talk (LBT). The transceiver 510 is configured to coordinate with the access type module 508 to transmit, to a second wireless communication device, a communication signal in the unlicensed band without performing the LBT in response to the processor 402 determining the one or more criteria are satisfied.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

As discussed above, a wireless communication device (e.g., a BS 105 or a UE 115) may access a mmWave band in a shared spectrum without performing an LBT if a certain no-LBT criteria is satisfied. FIGS. 6A-6C and 7-8 illustrate various no-LBT criteria. In some instances, the no-LBT criteria may be based on a single parameter, for example, a EIRP, a directional EIRP, or a conducted power as will be discussed further below. In some instances, the no-LBT criteria may have a joint limit on two or more parameters, for example, a joint-limit on EIRP (or direction EIRP) and duty cycle, a joint limit on EIRP (or directional EIRP) and rank order, or a joint limit on EIRP (or directional EIRP), duty cycle, and a rank order as will be discussed further below.

Figure 6A:
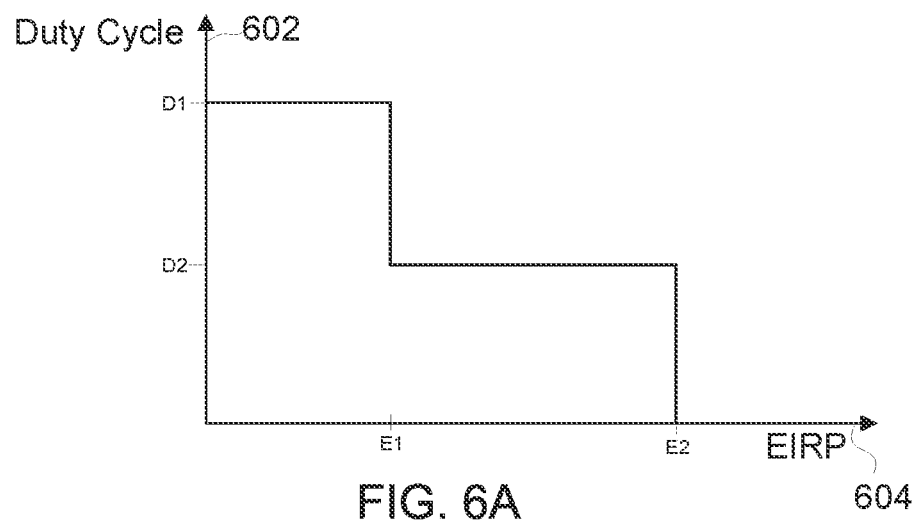
FIG. 6A illustrates the relationship between duty cycles and equivalent (or effective) isotropically radiated power (EIRP) according to some aspects of the present disclosure.
Figure 6B:
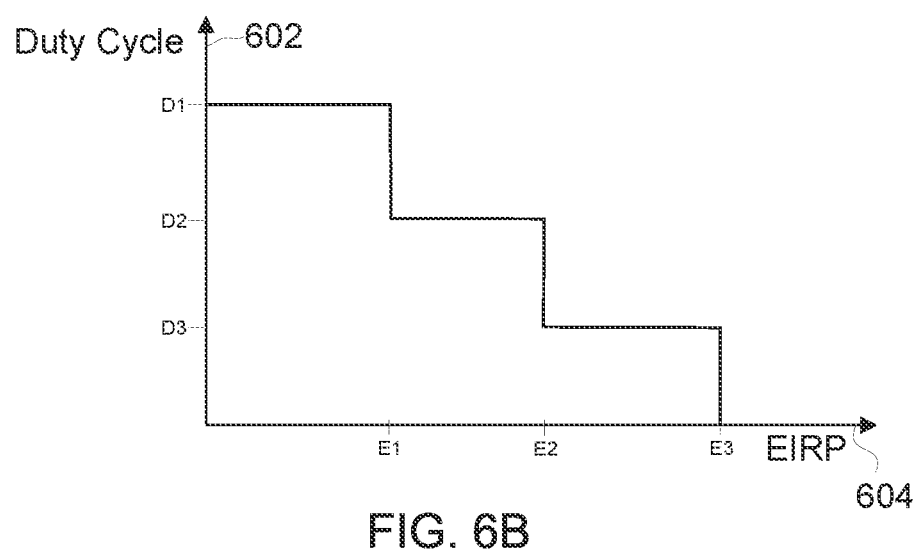
FIG. 6B illustrates the relationship between duty cycles and EIRP according to some aspects of the present disclosure.
Figure 6C:
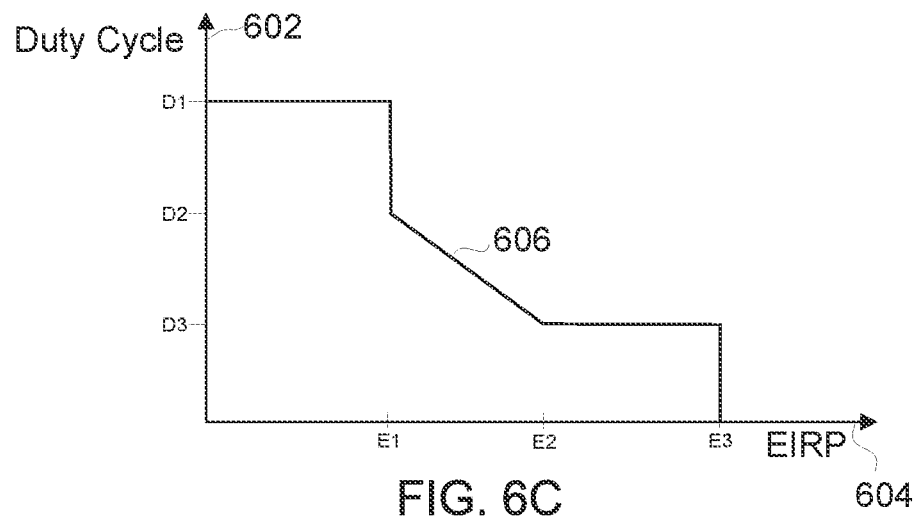
FIG. 6C illustrates the relationship between duty cycles and EIRP according to some aspects of the present disclosure.

FIGS. 6A-6C illustrate various exemplary joint EIRP-duty cycle limits on no-LBT transmissions according to some aspects of the present disclosure. The vertical axis 602 represents a duty cycle—the fraction of a period in which a transmitter transmits energy—in terms of a ratio or percentage. The horizontal axis 604 represents EIRP—the power in Watts radiated by an idealized isotropic antenna with same power density as an actual antenna, measured at a reference distance. The values along the curve represent EIRP and duty cycle values for joint EIRP-duty cycle limit criteria where duty cycle and EIRP are considered in tandem. In the joint limit scenario, criteria for determining whether to transmit without LBT may involve an inverse relationship between duty cycle and EIRP, so that criteria may be satisfied by high duty cycle values if EIRP values are low, and by high EIRP values if duty cycle values are low. For instance, a joint limit may include a maximum duty cycle permitted for a given EIRP. In some instances, a wireless communication device (e.g., a BS 105 or a UE 115) may store the inverse relationship between the duty cycle and the EIRP in the form of a lookup table at a memory (e.g., the memory 404 or 504). In some instances, the lookup table is predetermined and preconfigured at the memory. In some instances, when the wireless communication device is a UE, the wireless communication device may receive the lookup table from a BS. Both duty cycle and EIRP in FIGS. 6A-6C may represent directional variants, i.e., duty cycle may represent the fraction of a period over which a transmitter transmits energy in a given direction, and EIRP may represent directional EIRP (DEIRP), or the EIRP radiated along a particular direction. Both duty cycle and EIRP in FIGS. 6A-6C may represent instantaneous or average values. For the discussion of FIGS. 6A-6C, D represents measured duty cycle, and E represents expected EIRP.

FIG. 6A illustrates an exemplary scenario where criteria including a joint EIRP-duty cycle limit may be satisfied according to aspects of the present disclosure. Pairs of measured duty cycle and expected EIRP values along the curve may satisfy criteria that includes a joint EIRP-duty cycle limit. In FIG. 6A, the criteria are satisfied when:

$(D \leq D2$ and $E \leq E2)$ or $(D2 \leq D \leq D1$ and $E \leq E1)$.

FIG. 6B illustrates an exemplary scenario where criteria including a joint EIRP-duty cycle limit may be satisfied according to aspects of the present disclosure. Pairs of measured duty cycle and expected EIRP values along the curve may satisfy criteria that includes a joint EIRP-duty cycle limit. In FIG. 6B, the criteria are satisfied when:

$(D \leq D3$ and $E \leq E3)$, or $(D3 \leq D \leq D2$ and $E \leq E2)$, or $(D2 \leq D \leq D1$ and $E \leq E1)$.

FIG. 6C illustrates an exemplary scenario where criteria including a joint EIRP-duty cycle limit may be satisfied according to aspects of the present disclosure. Pairs of measured duty cycle and expected EIRP values along the curve may satisfy criteria that includes a joint EIRP-duty cycle limit. In FIG. 6C, the criteria are satisfied when:

$(D \leq D3$ and $E \leq E3)$ or $(D3 \leq D \leq D2$ and $E \leq f(x))$, where $f(x) = m^*[(E2-E1)/(D2-D3)]^*E$ and $m$ is the slope of line 606, or $(D2 \leq D \leq D1$ and $E \leq E1)$.

Figure 7:
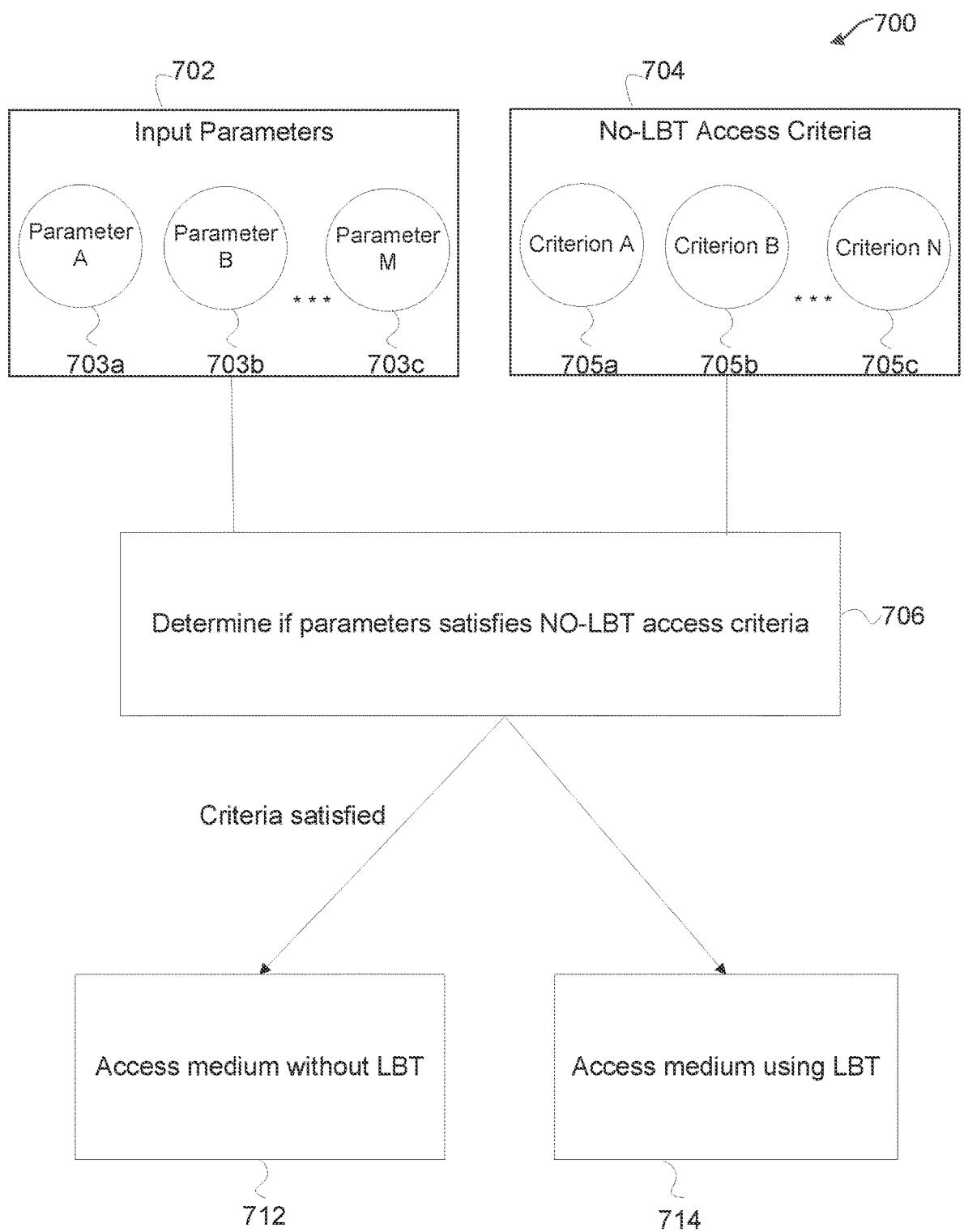
FIG. 7 illustrates a medium access method according to some aspects of the present disclosure.

FIG. 7 illustrates a medium access method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UE 115 or 400 or BS 105 or 500, may utilize one or more components, such as the processor 402 or 502, the memory 404 or 504, the access type module 408 or 508, the transceiver 410 or 510, the modem 412 or 512, or the one or more antennas 416 or 516, to execute the steps of method 700. As illustrated, the method 700 includes several enumerated steps, but aspects of the method 700 may include additional steps before, after, and in between the enumerated steps. In some aspects, one or more of the enumerated steps may be omitted or performed in a different order.

At block 702, the device may determine, calculate, or measure one or more parameters 703 (shown as 703a, 703b, . . . 703c) related to the present operating conditions. The parameters 703 may include, for example, power (conducted power or EIRP), duty cycle, beam width, number of spatial streams, and/or combinations thereof. Each of the parameters 703 may be instantaneous values, or average values over a period of time. Average values may be computed over non-overlapping periods of time, or over a rolling window, and may be logarithmic or linear. The device may apply a linear filter to the averaging operations, which in some instances may have a non-uniform response. In some aspects, the values for any parameter 703 may be determined on a directional basis. The operations of 702 may be performed according to the methods described herein.

At block 704, the device selects or receives one or more No-LBT access criteria 705 (shown as 705a, 705b, . . . 753c). In some instances, the device may correspond to a BS 105 or 500 and may select the criteria based on a lookup table. In some other instances, the device may correspond to a UE 115 or 400 and may receive the criteria via an RRC configuration from a BS 105 or 500. In some instances, the criteria may also be defined in a wireless communication standard. In some instances, the criteria may also be determined by a particular technology in use or a network operator of the device. The criteria may be related to the parameters 703 and include threshold values for comparison against the parameters as discussed below. The thresholds may be average or instantaneous values. The criteria may be selected to limit the size of interference (e.g., EIRP and conducted power limits), limit the persistence of interference over time (e.g., duty cycle, time average, and longest burst duration limits), or limit the spatial extent of interference (e.g., per-direction, beam width, and rank limits). The operations of 704 may be performed according to the methods described herein.

For example, block 702 may include a single parameter 703, which may be instantaneous EIRP or average EIRP. EIRP may refer to the product of transmitter power and the antenna gain in a given direction relative to an isotropic antenna of a radio transmitter, and average EIRP may refer to the linear or logarithmic average of EIRP values over a period of time. Block 704 may include a single criterion 705, which may include that instantaneous EIRP is less than an absolute threshold, or that average EIRP is less than an absolute threshold. Such a configuration may limit maximum interference in any direction and may be useful, for example, in very short range communication scenarios where devices may not require very high EIRP levels to communicate. Using an instantaneous EIRP as parameter 703 along with the corresponding threshold may ensure the device does not exceed the threshold level at any point when using No-LBT access, whereas using an average EIRP as parameter 703 along with the corresponding threshold may allow the device to occasionally exceed the threshold level and still access the network without LBT, so long as the average EIRP remains below the threshold. In some instances, the device may apply a linear filter to the averaging operations. In some instances, the linear filter may have a non-uniform response.

Similarly, block 702 may include a single parameter 703, which may be the directional average EIRP, and block 704 may include a single criterion, which may include that directional EIRP be below a threshold. The directional average EIRP of a transmitter at the origin along a direction $\theta$ may be defined as the time average of DEIRP in the direction $\theta$. The definition may include measurement of time average of the received energy for a reference receiver located in direction $\theta$ at a reference distance. The average may be computed over non-overlapping periods of time, or over a rolling window, and may be logarithmic or linear. The device may apply a linear filter to the averaging operations, which in some instances may have a non-uniform response. The no-LBT access criteria may be met along any direction $\theta$ for which the directional average EIRP along 0 is below the threshold. Specifying a limit on directional EIRP allows sporadic high EIRP values while still permitting no-LBT access, or large duty cycle values while EIRP values are low.

In another example, block 702 may include a single parameter 703, which may be instantaneous conducted power or average conducted power. Conducted power may refer to the transmitter power at the radio frontend, and average conducted power may refer to the linear or logarithmic average of conducted power measured over a period of time. Block 704 may include a single criterion 705, which may include that instantaneous conducted power is less than an absolute threshold, or that average conducted power is less than an absolute threshold. Such a configuration may permit beamforming with arbitrary antenna gains by limiting the total radiated interference from the device. Using an instantaneous conducted power as parameter 703a along with the corresponding threshold may ensure the device does not exceed the threshold level at any point when using No-LBT access, whereas using an average EIRP as parameter 703a along with the corresponding threshold may allow the device to occasionally exceed the threshold level and still access the network without LBT, so long as the average conducted power remains below the threshold. In some instances, the device may apply a linear filter to the averaging operations. In some instances, the linear filter may have a non-uniform response.

In another example, block 702 may include both EIRP and conducted power as parameters 703, instantaneous or average as described above, and block 703 may include the corresponding EIRP and conducted power thresholds, instantaneous or average, as described above.

In another example, block 702 may include two parameters 703, an EIRP value and a duty cycle value, average or instantaneous, and block 704 may include two criteria 705, one including that the EIRP parameter is less than an average or absolute EIRP threshold and another one including that the duty cycle be less than average or absolute threshold. Aspects of this example are illustrated in FIGS. 6A-6C. The No-LBT access criterial may be satisfied with an EIRP e provided that the duty cycle of a transmission is below a threshold where is dependent on e. Total duty cycle, the fraction of time where the node is transmitting averaged over a time window, may be represented by d, where d E [0,1]. A joint limit, as included in criteria 705, may then be specified in two alternative but equivalent forms: The maximum duty cycle permitted for a given EIRP may be expressed as (EIRP) E (0,1] for EIRP<=EIRP$_{max}$, and the maximum EIRP permitted by a given duty cycle may be expressed as EIRP(d) for d E (0,1].

In a variation of the previous example, the two parameters 703 and criteria 705 may be directional so that the parameters 703 include instantaneous or average directional EIRP (DEIRP) and directional duty cycle values, and criteria 704 include thresholds for instantaneous or average DEIRP and directional duty cycle. Aspects of this example are illustrated in FIGS. 6A-6C. DEIRP of a transmitter along a direction $\theta$ may be defined as power radiated by an idealized isotropic antenna with the same power density as observed along direction $\theta$ at a reference distance. Direction $\theta$ may be a 1 or 2-dimensional representation of a direction (e.g., unit vector) in 3D space in a coordinate system with a transmitter device at the origin. Conducted power $P_T$, antenna radiation pattern $G_T(\theta)$, and directional-EIRP DEIRP($\theta$) are related as DEIRP($\theta$)=$P_T$+$G_T(\theta)$.

Conventional EIRP can be obtained from DEIRP as $$EIRP = PT + \max_\theta G_T(\theta) \text{ or } EIRP = \max_\theta DEIRP(\theta).$$

Directional duty cycle d of a transmitter at the origin along direction $\theta$ may be defined as the average fraction of time at transmitter transmits energy in the direction $\theta$. The definition may also include measurement of the average fraction of time the received energy is above a threshold for a reference receiver located in direction $\theta$ at a reference distance. The No-LBT access criterial may be satisfied along any direction $\theta$ if the DEIRP and directional duty cycle satisfy the joint limit specified by the criteria 705. The joint limit may be specified in two alternative but equivalent forms: The maximum directional duty cycle permitted for a given DEIRP may be expressed as $d_{max}$(DEIRP)$\in$(0,1] for DEIRP<=DEIRP$_{max}$, and the maximum DEIRP permitted by a given directional duty cycle may be expressed as DEIRP(d) ford E (0,1]. In this example, a BS 105 or 500 may serve multiple UEs 115 or 300 using directional beams with no LBT provided the DEIRP and duty cycle limits along each UE's direction are observed separately.

In a variation of the previous example, a third parameter 703 may include a number of spatial streams (i.e., rank), and a third criterion 705 may include a rank threshold. In this example, different joint limits for DEIRP and directional duty cycle (instantaneous or average) may apply when the rank is below the rank threshold than when the rank is above the rank threshold. The joint limits may be specified in two alternative but equivalent forms: the maximum durational duty cycle permitted for a given DEIRP and rank R may be expressed as $d_{max}$(DEIRP)$\in$(0,1] for DEIRP<=DEIRP$_{max}$ and Rank R, and maximum DEIRP for a given directional duty cycle d and rank R may be expressed as DEIRP(d, R) for d$\in$(0,1]. This example is particularly effective in the situation illustrated in FIG. 2 when communication between a UE 230 and a BS 210 causes interference for a UE 220 in the line of sight of UE 230 and BS 210, since a line of sight interferer's spatial structure is likely to match that at its intended receiver. In mmW operations with high directionality at transmitters, the number of primary sources of strong interference is small, for example, 1. Due to high attenuations via blocking, a strong interferer is likely to be a line of sight interferer. Because of the high directionality of the transmissions, the spatial structure of the interference at the victim node may correlate highly with the spatial structure of the signal at the intended receiver of the interfering transmitter. As a result, a low rank transmission may create a low rank interference, which is easier to suppress than spatially symmetric interference or high rank interference, for any victim node. It may be possible then, as described above, to permit low rank no-LBT transmissions when EIRP is constrained.

In another example, block 702 may include two parameters 703, an EIRP value, average or instantaneous, and a rank value (i.e., a value indicating the number of spatial streams), and block 704 may include two criteria 705, one including that the EIRP parameter is less than an average or absolute EIRP threshold and a one including that the rank value be below a rank threshold. In this example, the no-LBT access criteria may be satisfied when rank is below the rank threshold and EIRP is constrained below the EIRP threshold. For EIRP thresholds E1 and E2 and rank threshold R1, the no-LBT access criteria may be satisfied if EIRP<E1 and Rank<R1, or when EIRP<E2 and Rank>R1, where E2<E1. The same holds true when EIRP refers to average EIRP.

In another example, the block 702 may include a beam width (e.g., a 3D beam width) as the single parameter 703, the single criterion 705 may include a beam width limit. The limit may be on instantaneous, average, or long-term 3D beam width. Since, for a given EIRP, a transmitter with a narrower beam width has a smaller interference footprint than a transmitter with a wider beam, it may possible to allow no-LBT transmissions for narrower beams. Thus, a no-LBT criterion based on a beam width may be defined in relation to an EIRP threshold. For instance, an instantaneous 3D beam width may be defined as the solid angle around a transmitter where the instantaneous EIRP exceeds a threshold, $e_0$. The instantaneous 3D beam width footprint may then be expressed as $A(e_0, t):=\{\theta: DEIRP(\theta, t)>=e_0\}$, where $\theta$ is a direction, t is a time, and DEIRP is the instantaneous DEIRP for direction $\theta$ at time t. The 3D beam width for the EIRP threshold $e_0$ measures the size of the set of beams $m(A(e_0, t))$ at time t, for example, via a solid angle metric (e.g., steradians), exceeding the EIRP threshold $e_0$. The average 3D beam width measures the time average of $m(A(e_0, t))$. For instance, the device may measure an instantaneous 3D beam width (for the EIRP threshold $e_0$) at each of a plurality of time instants and calculate a time average for over the instantaneous 3D beam widths. The long-term beam width footprint may then be defined as $\{A(e_0):=\{\theta: DEIRP(\theta, t)>=e_0 \text{ for some interval } t\in[t_1, t_2]\}\}$ where $t_1$ and $t_2$ are time values. For instance, the device may compute the long-term beam width footprint as the size of the set of all beam directions for which DEIRP exceeds an EIRP threshold e0 in that beam direction at any time within a time interval. The long-term beam width footprint may also be defined in terms of average EIRP, in which case the long-term beam width footprint is the size of the set of all beam directions for which average EIRP exceeds an EIRP threshold e0 in that beam direction at any time within a time interval. In some other instances, the long-term beam width footprint may also be defined in terms of duty cycle. For instance, the device may compute the long-term beam width footprint as the set of directions where the duty cycle of the direction EIRP exceeding e0 is greater than a duty cycle threshold d. The long-term 3D beam width measures the size of the set m(A(e0)). The size of instantaneous or long-term beam footprint may be measured by placing reference receivers around the transmitter at a reference/grid distance. The no-LBT criteria may be satisfied for all directions if DEIRP<=e0 for a beam width threshold A0. In some aspects, the no-LBT criteria may be based on an instantaneous beam footprint of the device. For example, the no-LBT criteria is satisfied if $m(A(e0, t))<=A0$ at all times t. In some aspects, the no-LBT criteria may be based on an average beam footprint of the device. For example, the no-LBT criteria is satisfied if $Average(m(A(e_0, t)))<=A_0$ over a period $[t_1, t_2]$. In some aspects, the no-LBT criteria may be based on a long-term beam footprint of the device. For example, the no-LBT criteria may also be satisfied if $m(A(e_0))<=A_0$. While the beam footprint-base no-LBT criteria is discussed in the context of 3D solid angle measurements (e.g., in steradians), the no-LBT criteria can be based on 2D beam footprint with 2D angle measurements along a reference plane (e.g., azimuth at a given height) and corresponding thresholds instead.

At block 706, the device may determine whether to transmit signals without using LBT based on the parameters 703 and the criteria 705 as described in the examples above. The device may determine that a no-LBT transmission is allowed if all criteria 705 are satisfied. Alternatively, the device may determine that a no-LBT transmission is allowed if some number of criteria 705 are satisfied. The device may also evaluate the criteria on a directional basis so that the criteria may be satisfied for some directions but not others. The operations of 706 may be performed according to the methods described herein.

If the no-LBT criteria are satisfied, the device may transmit a signal at block 712 without performing LBT. If the no-LBT criteria are satisfied for some directions, but not all directions, the device may transmit signals at block 712 without performing LBT for those directions satisfying the no-LBT criteria. The operations of 712 may be performed according to the methods described herein.

If the no-LBT criteria are not satisfied, the device may perform LBT before transmitting a signal at block 714. If the no-LBT criteria are satisfied for some directions and not others, the device may perform LBT before transmitting signals at block 712 using LBT for those directions for which the criteria are not satisfied. The operations of 714 may be performed according to the methods described herein.

Figure 8:
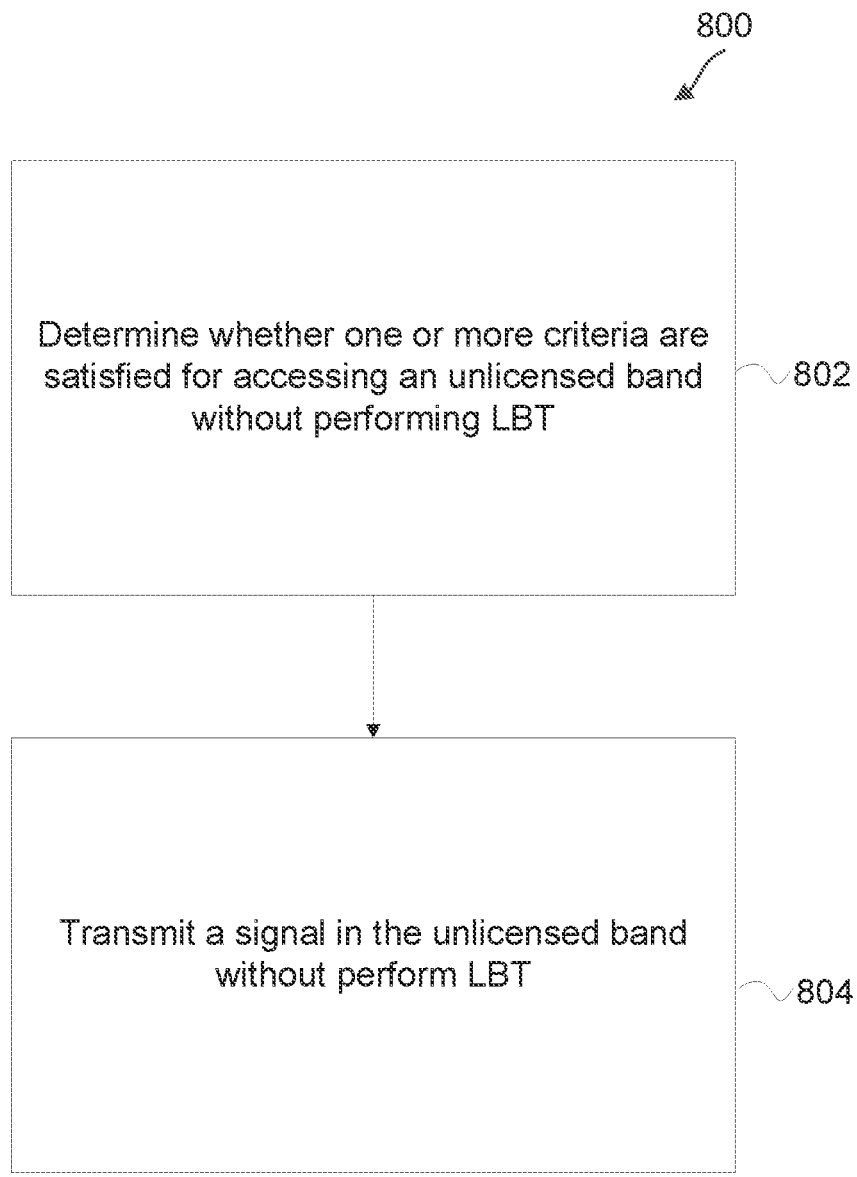
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UE 115 or 400, may utilize one or more components, such as the processor 402, the memory 404, the access type module 408, the transceiver 410, the modem 412, or the one or more antennas 416, to execute the steps of method 800. The method 800 may employ similar mechanisms as method 700 described above with respect to FIG. 7. As illustrated, the method 800 includes several enumerated steps, but aspects of the method 800 may include additional steps before, after, and in between the enumerated steps. In some aspects, one or more of the enumerated steps may be omitted or performed in a different order.

At block 802, a first wireless communication device, which may be a UE 115 or 400, or a BS 105 or 500, determines whether one more criteria are satisfied for accessing an unlicensed band of a shared spectrum (which may be a mmW band) without performing LBT. The device may utilize one or more components, such as the processor 402 or 502, the memory 404 or 504, and the access type module 408 or 508 to make the determination. The access criteria may be any combination of the criteria described in the discussion of FIG. 7. The operations of 802 may be performed according to the methods described herein.

In some instances, determining whether the one or more criteria are satisfied includes determining, by the first wireless communication device, whether a power level satisfies a power threshold as described with reference to FIG. 7. The power level may include an equivalent isotropically radiated power (EIRP), which may be an instantaneous EIRP or an average EIRP. The power level may also include a conducted power, which may be an instantaneous conducted power or an average conducted power. The first wireless communication device may determine that an average EIRP in a first direction satisfies a directional power threshold and transmit the communication signal in the unlicensed band in the first direction without performing the LBT.

In some instances, the determining whether the one or more criteria are satisfied includes determining, by the first wireless communication device, whether an average power level satisfies an average power threshold. The average power level may be calculated in at least one of a log domain or a linear domain, and as a moving average or over a plurality of non-overlapping time periods. The first wireless communication device may determine that a first average power level in a first direction satisfies a directional average power threshold, and transmit the communication signal in the unlicensed band in the first direction without performing the LBT. The first wireless communication device may also determine that a second average power level in a second direction does not satisfy the directional average power threshold and perform an LBT in the second direction.

In some instances, determining whether the one or more criteria are satisfied includes determining, by the first wireless communication device, whether a duty cycle satisfies a duty cycle threshold as discussed with reference to FIG. 7. The duty cycle threshold may be correlated with the power threshold. For example, the duty cycle threshold may be a function of the power threshold. A first duty cycle threshold may correspond to a first power level threshold and a second duty cycle threshold correspond may correspond to a second power level threshold, where the first power level threshold is greater than the second power level threshold and the second duty cycle threshold is less than the first duty cycle threshold. The first wireless communication device may determine that a first duty cycle in a first direction satisfies a directional duty cycle threshold and transmit the communication signal in the unlicensed band without performing the LBT includes in the first direction. The first wireless communication device may also determine that a second duty cycle in a second direction does not satisfy the directional duty cycle threshold and perform an LBT in the second.

In some instances, determining whether the one or more criteria are satisfied includes determining, by the first wireless communication device, whether a number of spatial streams (i.e., rank) satisfies a rank threshold as discussed with respect to FIG. 7. A first duty cycle threshold and/or a first power threshold may be correlated to a first rank threshold, and a second duty cycle threshold and/or second power threshold may be correlated to a second rank threshold, wherein the second rank threshold is greater that the first rank threshold and the second duty cycle threshold is less than or equal to the first duty cycle threshold, and/or the second power threshold is less than or equal to the first power threshold.

In some instances, at least one of the duty cycle threshold or the power threshold may be correlated to the rank threshold. The duty cycle threshold may also be correlated with the power threshold.

In some instances the determining whether the one or more criteria are satisfied includes determining, by the first wireless communication device, whether a beam width satisfies a beam width threshold as discussed with respect to FIG. 7. The beam width may include an instantaneous beam width, an average beam, a set of beam widths, a set of beam directions exceeding a threshold power level, and/or a size of the set of beam directions exceeding the threshold power level during an observation interval. The beam width may be measured in solid angle units or angle units based on a reference plane.

At block 804, the first wireless communication device transmits a signal to a second wireless communication device in the unlicensed band without first performing LBT in response to determining that the one or more criteria are satisfied, as discussed with respect to FIG. 7. The device may use the transceiver 410 or 510 and antennas 416 or 516 to transmit the signal. The first wireless communication device may also perform the LBT—which may be a category 2 or category 4 LBT—in the unlicensed band in response to determining that the one or more criteria are not satisfied. The operations of 804 may be performed according to the methods described herein.

In some instances, transmitting the communication signal in the unlicensed band without performing the LBT in response to determining the one or more criteria are satisfied includes transmitting the communication signal in a first direction, and performing the LBT in the unlicensed band includes performing the LBT in a second direction, the second direction being different than the first direction as discussed with respect to FIG. 7.

Further embodiments of the present disclosure include a non-transitory computer-readable medium having program code recorded thereon. The non-transitory computer-readable medium includes code for causing a first wireless communication device to determine whether one or more criteria are satisfied for accessing an unlicensed band of a shared spectrum without performing a listen-before-talk (LBT), and code for causing the first wireless communication device to transmit, to a second wireless communication device, a communication signal in the unlicensed band without performing the LBT in response to determining the one or more criteria are satisfied.

The non-transitory computer-readable medium may also include one or more of the following features. For instance, the code for causing the first wireless communication device to determine whether the one or more criteria are satisfied includes code for causing the first wireless communication device to determine whether a power level satisfies a power threshold. The power level includes an equivalent isotropically radiated power (EIRP).

The power level includes an instantaneous EIRP. The power level includes an average EIRP. The power level includes a conducted power. The power level includes an instantaneous conducted power. The power level includes an average conducted power. The code for causing the first wireless communication device to determine whether the one or more criteria are satisfied includes code for causing the first wireless communication device to determine whether a duty cycle satisfies a duty cycle threshold. The duty cycle threshold is correlated to the power threshold. The duty cycle threshold is correlated to the power threshold such that a first duty cycle threshold corresponds to a first power level threshold and a second duty cycle threshold corresponds to a second power level threshold, wherein the first power level threshold is greater than the second power level threshold and the second duty cycle threshold is less than the first duty cycle threshold. The code for causing the first wireless communication device to determine whether the duty cycle satisfies the duty cycle threshold includes code for causing the first wireless communication device to determine whether a first duty cycle in a first direction satisfies a directional duty cycle threshold, and the code for causing the first wireless communication device to transmit the communication signal in the unlicensed band without performing the LBT includes code for causing the first wireless communication device to transmit the communication signal in the first direction. The code for causing the first wireless communication device to determine whether a second duty cycle in a second direction satisfies the directional duty cycle threshold, and code for causing the first wireless communication device to perform an LBT in the second direction in response to determining the second duty cycle does not satisfy the directional duty cycle threshold. The code for causing the first wireless communication device to determine whether the power level satisfies the power threshold includes code for causing the first wireless communication device to determine whether an average equivalent isotropically radiated power (EIRP) in a first direction satisfies a directional power threshold, and the code for causing the first wireless communication device to transmit the communication signal in the unlicensed band without performing the LBT includes code for causing the first wireless communication device to transmit the communication signal in the first direction. The code for causing the first wireless communication device to determine whether the one or more criteria are satisfied includes code for causing the first wireless communication device to determine whether a number of spatial streams satisfies a rank threshold. At least one of a first duty cycle threshold or a first power threshold is correlated to a first rank threshold, and at least one of a second duty cycle threshold or a second power threshold is correlated to a second rank threshold, wherein the second rank threshold is greater that the first rank threshold and at least one of the second duty cycle threshold is less than or equal to the first duty cycle threshold, or the second power threshold is less than or equal to the first power threshold. The power level includes an equivalent isotropically radiated power (EIRP). The power level includes an average EIRP. At least one of the duty cycle threshold or the power threshold is correlated to the rank threshold. The duty cycle threshold is correlated to the power threshold. The code for causing the first wireless communication device to determine whether the one or more criteria are satisfied includes code for causing the first wireless communication device to determine whether a beam width satisfies a beam width threshold. The beam width includes an instantaneous beam width. The beam width includes an average beam width. The beam width includes a set of beam widths. The beam width includes a set of beam directions exceeding a threshold power level. The beam width includes a size of the set of beam directions exceeding the threshold power level during an observation interval. The beam width is measured in solid angle units. The beam width is measured in angle units based on a reference plane. The code for causing the first wireless communication device to determine whether the one or more criteria are satisfied includes code for causing the first wireless communication device to determine whether an average power level satisfies an average power threshold. The average power level is calculated in at least one of a log domain or a linear domain. The average power level is calculated as a moving average or calculated over a plurality of non-overlapping time periods. The code for causing the first wireless communication device to determine whether the average power level satisfies the average power threshold includes code for causing the first wireless communication device to determine whether a first average power level in a first direction satisfies a directional average power threshold, and the code for causing the first wireless communication device to transmit the communication signal in the unlicensed band without performing the LBT includes code for causing the first wireless communication device to transmit the communication signal in the first direction. The non-transitory computer-readable medium may further include code for causing the first wireless communication device to determine whether a second average power level in a second direction satisfies the directional average power threshold, and code for causing the first wireless communication device to perform an LBT in the second direction in response to determining the second average power level does not satisfy the directional average power threshold. The code for causing the first wireless communication device to perform, in response to determining the one or more criteria are not satisfied, the LBT in the unlicensed band. The code for causing the first wireless communication device to transmit the communication signal in the unlicensed band without performing the LBT in response to determining the one or more criteria are satisfied includes code for causing the first wireless communication device to transmit the communication signal in a first direction, and the code for causing the first wireless communication device to perform the LBT in the unlicensed band includes code for causing the first wireless communication device to perform the LBT in a second direction, the second direction being different than the first direction. The code for causing the first wireless communication device to perform the LBT in the unlicensed band includes at least one of code for causing the first wireless communication device to perform a category 2 LBT or code for causing the first wireless communication device to perform a category 4 LBT. The first wireless communication device is a user equipment (UE). The first wireless communication device is a base station. The unlicensed band of the shared spectrum includes a millimeter wave (mmW) band.

Further aspects of the present disclosure include the following:

1. A method of wireless communication, comprising:
    determining, by a first wireless communication device, whether one or more criteria are satisfied for accessing an unlicensed band of a shared spectrum without performing a listen-before-talk (LBT); and
    transmitting, by the first wireless communication device to a second wireless communication device, a communication signal in the unlicensed band without performing the LBT in response to determining the one or more criteria are satisfied.

2. The method of clause 1, wherein the determining whether the one or more criteria are satisfied includes:
    determining, by the first wireless communication device, whether a power level satisfies a power threshold.

3. The method of clause 2, wherein the power level includes an equivalent isotropically radiated power (EIRP).

4. The method of clause 3, wherein the power level includes an instantaneous EIRP.

5. The method of clause 3, wherein the power level includes an average EIRP.

6. The method of clause 2, wherein the power level includes a conducted power.

7. The method of clause 6, wherein the power level includes an instantaneous conducted power.

8. The method of clause 6, wherein the power level includes an average conducted power.

9. The method of at least one of clause 1 or clause 2, wherein the determining whether the one or more criteria are satisfied includes:
    determining, by the first wireless communication device, whether a duty cycle satisfies a duty cycle threshold.

10. The method of clause 9, wherein the duty cycle threshold is correlated to the power threshold.

11. The method of clause 10, wherein the duty cycle threshold is correlated to the power threshold such that a first duty cycle threshold corresponds to a first power level threshold and a second duty cycle threshold corresponds to a second power level threshold, wherein the first power level threshold is greater than the second power level threshold and the second duty cycle threshold is less than the first duty cycle threshold.

12. The method of clause 9, wherein:
    the determining whether the duty cycle satisfies the duty cycle threshold includes determining whether a first duty cycle in a first direction satisfies a directional duty cycle threshold; and
    the transmitting the communication signal in the unlicensed band without performing the LBT includes transmitting the communication signal in the first direction.

13. The method of clause 12, further comprising:
    determining whether a second duty cycle in a second direction satisfies the directional duty cycle threshold; and
    performing, by the first wireless communication device, an LBT in the second direction in response to determining the second duty cycle does not satisfy the directional duty cycle threshold.

14. The method of clause 9, wherein:
    the determining whether the power level satisfies the power threshold includes determining whether an average equivalent isotropically radiated power (EIRP) in a first direction satisfies a directional power threshold; and
    the transmitting the communication signal in the unlicensed band without performing the LBT includes transmitting the communication signal in the first direction.

15. The method of at least one of clause 1, clause 2, or clause 9, wherein the determining whether the one or more criteria are satisfied includes:
    determining, by the first wireless communication device, whether a number of spatial streams satisfies a rank threshold.

16. The method of clause 15, wherein:
    at least one of a first duty cycle threshold or a first power threshold is correlated to a first rank threshold; and
    at least one of a second duty cycle threshold or a second power threshold is correlated to a second rank threshold, wherein the second rank threshold is greater that the first rank threshold and at least one of:
        the second duty cycle threshold is less than or equal to the first duty cycle threshold; or
        the second power threshold is less than or equal to the first power threshold.

17. The method of at least one of clause 15 or clause 16, wherein the power level includes an equivalent isotropically radiated power (EIRP).

18. The method of clause 17, wherein the power level includes an average EIRP.

19. The method of clause 15, wherein at least one of the duty cycle threshold or the power threshold is correlated to the rank threshold.

20. The method of clause 19, wherein the duty cycle threshold is correlated to the power threshold.

21. The method of at least one of clause 1, clause 2, clause 9, or clause 15, wherein the determining whether the one or more criteria are satisfied includes:
    determining, by the first wireless communication device, whether a beam width satisfies a beam width threshold.

22. The method of clause 21, wherein the beam width includes an instantaneous beam width.

23. The method of clause 21, wherein the beam width includes an average beam width.
24. The method of clause 21, wherein the beam width includes a set of beam widths.
25. The method of clause 21, wherein the beam width includes a set of beam directions exceeding a threshold power level.
26. The method of clause 25, wherein the beam width includes a size of the set of beam directions exceeding the threshold power level during an observation interval.
27. The method of at least one of clause 21, clause 22, clause 23, clause 24, clause 25, or clause 26, wherein the beam width is measured in solid angle units.
28. The method of at least one of clause 21, clause 22, clause 23, clause 24, clause 25, or clause 26, wherein the beam width is measured in angle units based on a reference plane.
29. The method of at least one of clause 1, clause 2, clause 9, clause 15, or clause 21, wherein the determining whether the one or more criteria are satisfied includes:
determining, by the first wireless communication device, whether an average power level satisfies an average power threshold.
30. The method of clause 29, wherein the average power level is calculated in at least one of a log domain or a linear domain.
31. The method of at least one of clause 29 or clause 30, wherein the average power level is calculated as a moving average or calculated over a plurality of non-overlapping time periods.
32. The method of clause 29, wherein:
the determining whether the average power level satisfies the average power threshold includes determining whether a first average power level in a first direction satisfies a directional average power threshold; and
the transmitting the communication signal in the unlicensed band without performing the LBT includes transmitting the communication signal in the first direction.
33. The method of clause 32, further comprising:
determining whether a second average power level in a second direction satisfies the directional average power threshold; and
performing, by the first wireless communication device, an LBT in the second direction in response to determining the second average power level does not satisfy the directional average power threshold.
34. The method of at least one of clause 1, clause 2, clause 9, clause 15, clause 21, clause 29, further comprising:
performing, by the first wireless communication device in response to determining the one or more criteria are not satisfied, the LBT in the unlicensed band.
35. The method of clause 34, wherein:
the transmitting the communication signal in the unlicensed band without performing the LBT in response to determining the one or more criteria are satisfied includes transmitting the communication signal in a first direction; and
the performing the LBT in the unlicensed band includes performing the LBT in a second direction, the second direction being different than the first direction.
36. The method of at least one of clause 34 or clause 35, wherein the performing the LBT in the unlicensed band includes at least one of a category 2 LBT or a category 4 LBT.
37. The method of any of clauses 1-36, wherein the first wireless communication device includes a user equipment (UE).
38. The method of any of clauses 1-36, wherein the first wireless communication device includes a base station.
39. The method of any of clauses 1-38, wherein the unlicensed band of the shared spectrum includes a millimeter wave (mmW) band.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A method of wireless communication, comprising:
determining; by a first wireless communication device, whether one or more criteria are satisfied for accessing an unlicensed band of a shared spectrum without performing a listen-before-talk (LBT), wherein the determining whether the one or more criteria are satisfied includes determining, by the first wireless communi- cation device, whether a power level associated with a first direction satisfies a power threshold; and transmitting; by the first wireless communication device to a second wireless communication device, a communication signal in the unlicensed band without performing the LBT in response to determining the one or more criteria are satisfied.

2. The method of claim 1, wherein the power level includes at least one of an instantaneous equivalent isotropically radiated power (EIRP), an average EIRP, an instantaneous conducted power, or an average conducted power.

3. The method of claim 1, wherein the determining whether the one or more criteria are satisfied includes:
   determining, by the first wireless communication device, whether a duty cycle satisfies a duty cycle threshold.

4. The method of claim 3, wherein the duty cycle threshold is correlated to the power threshold.

5. The method of claim 3, wherein:
   the determining whether the duty cycle satisfies the duty cycle threshold includes determining whether a first duty cycle in the first direction satisfies a directional duty cycle threshold; and
   the transmitting the communication signal in the unlicensed band without performing the LBT includes transmitting the communication signal in the first direction.

6. The method of claim 5, further comprising:
   determining whether a second duty cycle in a second direction satisfies the directional duty cycle threshold; and
   performing, by the first wireless communication device, an LBT in the second direction in response to determining the second duty cycle does not satisfy the directional duty cycle threshold.

7. The method of claim 3, wherein
   the determining whether the power level satisfies the power threshold includes determining whether an average equivalent isotropically radiated power (EIRP) in a first direction satisfies a directional power threshold; and
   the transmitting the communication signal in the unlicensed band without performing the LBT includes transmitting the communication signal in the first direction.

8. The method of claim 1, or claim 4, wherein the determining whether the one or more criteria are satisfied includes:
   determining, by the first wireless communication device, whether a number of spatial streams satisfies a rank threshold.

9. The method of claim 8, wherein:
   at least one of a first duty cycle threshold or a first power threshold is correlated to a first rank threshold; and
   at least one of a second duty cycle threshold or a second power threshold is correlated to a second rank threshold, wherein the second rank threshold is greater that the first rank threshold and at least one of:
   the second duty cycle threshold is less than or equal to the first duty cycle threshold; or
   the second power threshold is less than or equal to the first power threshold.

10. The method of claim 8, wherein at least one of the duty cycle threshold or the power threshold is correlated to the rank threshold.

11. The method of claim 10, wherein the duty cycle threshold is correlated to the power threshold.

12. The method of claim 1, wherein the determining whether the one or more criteria are satisfied includes:
   determining, by the first wireless communication device, whether a beam width satisfies a beam width threshold.

13. The method of claim 12, wherein the beam width includes at least one of an instantaneous beam width, an average beam width, a set of beam widths, or a set of beam directions exceeding a threshold power level, or a size of the set of beam directions exceeding the threshold power level during an observation interval.

14. The method of at least one of claim 1, wherein the power level is an average power level, and the power threshold is an average power threshold.

15. The method of claim 14, wherein:
   the determining whether the power level satisfies the power threshold includes determining whether a first average power level in the first direction satisfies a directional average power threshold; and
   the transmitting the communication signal in the unlicensed band without performing the LBT includes transmitting the communication signal in the first direction.

16. The method of claim 15, further comprising:
   determining whether a second average power level in a second direction satisfies the directional average power threshold; and
   performing, by the first wireless communication device, an LBT in the second direction in response to determining the second average power level does not satisfy the directional average power threshold.

17. The method of claim 1, further comprising:
   performing, by the first wireless communication device in response to determining the one or more criteria are not satisfied, the LBT in the unlicensed band.

18. The method of claim 17, wherein:
   the transmitting the communication signal in the unlicensed band without performing the LBT in response to determining the one or more criteria are satisfied includes transmitting the communication signal in the first direction; and
   the performing the LBT in the unlicensed band includes performing the LBT in a second direction, the second direction being different than the first direction.

19. An apparatus, comprising:
   a processor configured to:
      determine whether one or more criteria are satisfied for accessing an unlicensed band of a shared spectrum without performing a listen-before-talk (LBT), wherein the determining whether the one or more criteria are satisfied includes determining whether a power level associated with a first direction satisfies a power threshold; and
   a transceiver in communication with the processor, the transceiver configured to:
      transmit, to a second wireless communication device, a communication signal in the unlicensed band without performing the LBT in response to the processor determining the one or more criteria are satisfied.

20. The apparatus of claim 19, wherein the power level includes at least one of an instantaneous equivalent isotropically radiated power (EIRP), an average EIRP, an instantaneous conducted power, or an average conducted power.

21. The apparatus of claim 19, wherein the processor is further configured to:
   determine whether a duty cycle satisfies a duty cycle threshold.

22. The apparatus of claim 21, wherein the duty cycle threshold is correlated to the power threshold.

23. The apparatus of claim 21, wherein:
the processor is further configured to determine whether a first duty cycle in the first direction satisfies a directional duty cycle threshold; and
the transceiver is further configured to transmit the communication signal in the first direction.

24. The apparatus of claim 23, wherein:
the processor is further configured to determine whether a second duty cycle in a second direction satisfies the directional duty cycle threshold; and
the transceiver is further configured to perform an LBT in the second direction in response to the processor determining the second duty cycle does not satisfy the directional duty cycle threshold.

25. The apparatus of claim 21, wherein:
the processor is further configured to determine whether an average equivalent isotropically radiated power (EIRP) in a first direction satisfies a directional power threshold; and
the transceiver is further configured to transmit the communication signal in the first direction.

26. The apparatus of at least one of claim 19, wherein the processor is further configured to:
determine whether a beam width satisfies a beam width threshold.

27. The apparatus of claim 26, wherein the beam width includes at least one of an instantaneous beam width, an average beam width, a set of beam widths, a set of beam directions exceeding a threshold power level, or a size of the set of beam directions exceeding the threshold power level during an observation interval.

28. An apparatus, comprising:
means for determining whether one or more criteria are satisfied for accessing an unlicensed band of a shared spectrum without performing a listen-before-talk (LBT), wherein the determining whether the one or more criteria are satisfied includes determining whether a power level associated with a first direction satisfies a power threshold; and
means for transmitting, to a wireless communication device, a communication signal in the unlicensed band without performing the LBT in response to determining the one or more criteria are satisfied.

29. The apparatus of claim 19, wherein the power level is an average power level, and the power threshold is an average power threshold.

30. The apparatus of claim 29, wherein:
the determining whether the power level satisfies the power threshold includes determining whether a first average power level in the first direction satisfies a directional average power threshold; and
the transmitting the communication signal in the unlicensed band without performing the LBT includes transmitting the communication signal in the first direction.

* * * * *